United States Patent
Kim et al.

(10) Patent No.: US 8,813,193 B2
(45) Date of Patent: Aug. 19, 2014

(54) MOBILE TERMINAL AND INFORMATION SECURITY SETTING METHOD THEREOF

(75) Inventors: Moonju Kim, Gyeonggi-Do (KR); Suyeon Song, Seoul (KR); Yunmi Kwon, Seoul (KR); Hyemi Jung, Seoul (KR); Arim Kwon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/217,212

(22) Filed: Aug. 24, 2011

(65) Prior Publication Data

US 2012/0054838 A1   Mar. 1, 2012

(30) Foreign Application Priority Data

Sep. 1, 2010   (KR) .................. 10-2010-0085646

(51) Int. Cl.
- *H04W 12/08* (2009.01)
- *H04L 29/06* (2006.01)
- *G06F 21/00* (2013.01)

(52) U.S. Cl.
USPC .................. 726/4; 726/3; 726/27; 726/28

(58) Field of Classification Search
None
See application file for complete search history.

(56) References Cited

U.S. PATENT DOCUMENTS

| | | | |
|---|---|---|---|
| 6,158,009 A * | 12/2000 | Ayukawa et al. ................. 726/4 |
| 6,937,730 B1 | 8/2005 | Buxton | |
| 7,433,473 B2 * | 10/2008 | Kudelski et al. ............. 380/259 |
| 7,747,680 B2 * | 6/2010 | Ravikumar et al. ........... 709/203 |
| 7,874,013 B2 * | 1/2011 | Kaminaga et al. .............. 726/28 |
| 8,073,866 B2 * | 12/2011 | Eagle et al. .................... 707/770 |
| 8,108,359 B1 * | 1/2012 | Cooley et al. ................. 707/687 |
| 8,385,971 B2 * | 2/2013 | Rhoads et al. ............. 455/556.1 |
| 8,407,093 B2 * | 3/2013 | Cartmell .................... 705/14.64 |
| 2003/0237006 A1 * | 12/2003 | Himmel et al. ............... 713/202 |
| 2004/0044894 A1 * | 3/2004 | Lofgren et al. ............... 713/176 |
| 2004/0145654 A1 * | 7/2004 | Motohashi ................. 348/14.02 |
| 2004/0204060 A1 * | 10/2004 | Makinouchi et al. ...... 455/556.1 |
| 2005/0021625 A1 * | 1/2005 | Fujimura et al. .............. 709/204 |
| 2005/0055579 A1 * | 3/2005 | Kanda et al. .................. 713/201 |
| 2005/0091518 A1 * | 4/2005 | Agarwal et al. ............... 713/193 |
| 2005/0197922 A1 | 9/2005 | Pezaris et al. | |
| 2005/0246772 A1 * | 11/2005 | Ganesh et al. .................. 726/21 |
| 2006/0010155 A1 * | 1/2006 | D'Hers et al. ................ 707/102 |

(Continued)

FOREIGN PATENT DOCUMENTS

JP   200550012 A  *  2/2005
JP   2005258679 A  *  9/2005

OTHER PUBLICATIONS

Boyle et al., "The Effects of Filtered Video on Awareness and Privacy", XP-002665918, 2000.

(Continued)

*Primary Examiner* — Andrew Nalven
*Assistant Examiner* — Walter Malinowski
(74) *Attorney, Agent, or Firm* — Lee, Hong, Degerman, Kang & Waimey

(57) ABSTRACT

An information security method for a mobile terminal. The method includes setting security information for a content associated with a first user, uploading the content to a Social Network Service (SNS) site, and uploading the security information to the SNS site to permit the SNS site to register the security information in order to display the content according to the security information when the content is accessed by a second user via the SNS site.

14 Claims, 16 Drawing Sheets

(56) References Cited

U.S. PATENT DOCUMENTS

| | | | |
|---|---|---|---|
| 2006/0064384 A1* | 3/2006 | Mehrotra et al. | 705/57 |
| 2006/0181547 A1* | 8/2006 | Loo | 345/619 |
| 2006/0238380 A1* | 10/2006 | Kimchi et al. | 340/995.1 |
| 2007/0150340 A1* | 6/2007 | Cartmell | 705/14 |
| 2007/0220540 A1* | 9/2007 | Walker et al. | 725/14 |
| 2008/0034052 A1* | 2/2008 | Bess et al. | 709/207 |
| 2008/0045189 A1* | 2/2008 | Kim et al. | 455/414.2 |
| 2008/0117295 A1* | 5/2008 | Ebrahimi et al. | 348/143 |
| 2008/0219493 A1* | 9/2008 | Tadmor | 382/100 |
| 2008/0229215 A1* | 9/2008 | Baron et al. | 715/751 |
| 2009/0016615 A1* | 1/2009 | Hull et al. | 382/217 |
| 2009/0085918 A1* | 4/2009 | Hollingworth et al. | 345/475 |
| 2009/0216769 A1* | 8/2009 | Bellwood et al. | 707/9 |
| 2009/0222766 A1* | 9/2009 | Chae et al. | 715/835 |
| 2009/0228486 A1* | 9/2009 | Kuehr-McLaren et al. | 707/9 |
| 2009/0259932 A1* | 10/2009 | Bank et al. | 715/229 |
| 2009/0292814 A1* | 11/2009 | Ting et al. | 709/229 |
| 2009/0300480 A1* | 12/2009 | Cohen et al. | 715/234 |
| 2009/0323087 A1* | 12/2009 | Luo | 358/1.9 |
| 2010/0016003 A1* | 1/2010 | Shapiro et al. | 709/202 |
| 2010/0088364 A1* | 4/2010 | Carter et al. | 726/6 |
| 2010/0110080 A1* | 5/2010 | Goodinson | 345/467 |
| 2010/0128923 A1* | 5/2010 | Kiya et al. | 382/100 |
| 2010/0153848 A1* | 6/2010 | Saha | 715/721 |
| 2010/0174722 A1* | 7/2010 | Carteri | 707/748 |
| 2010/0199340 A1* | 8/2010 | Jonas et al. | 726/8 |
| 2010/0246965 A1* | 9/2010 | Epshtein et al. | 382/187 |
| 2010/0306815 A1* | 12/2010 | Emerson et al. | 725/134 |
| 2011/0161999 A1* | 6/2011 | Klappert et al. | 725/25 |
| 2011/0202968 A1* | 8/2011 | Nurmi | 726/1 |
| 2011/0208572 A1* | 8/2011 | Ladd et al. | 705/14.16 |
| 2012/0075464 A1* | 3/2012 | Derenne et al. | 348/135 |

OTHER PUBLICATIONS

No Author Supplied in Source Data, "Applying Robust, Prioritized Filtering Rules to Categorized SAN Events," IP.COM Journal, May 2004, XP013020389, 6 pages.

European Patent Office Application Serial No. 11178841.0, Search Report dated Mar. 31, 2014, 6 pages.

* cited by examiner

FIG. 6B
[SET TAG]
SELECT FROM USER MENU
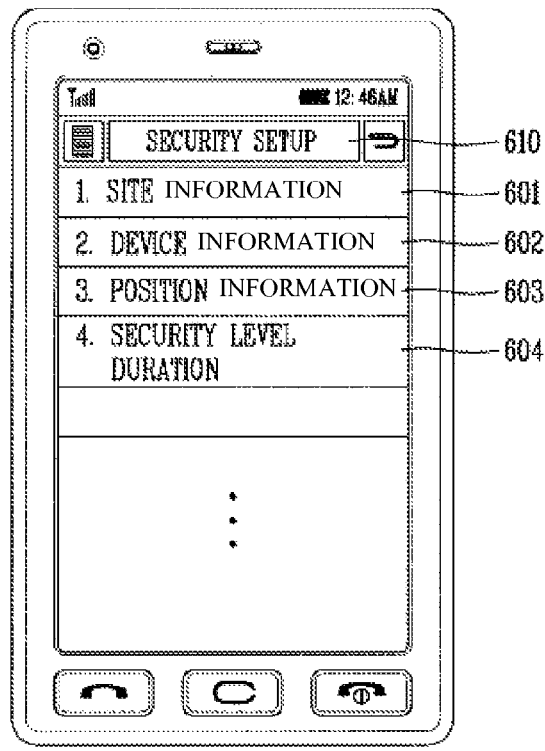

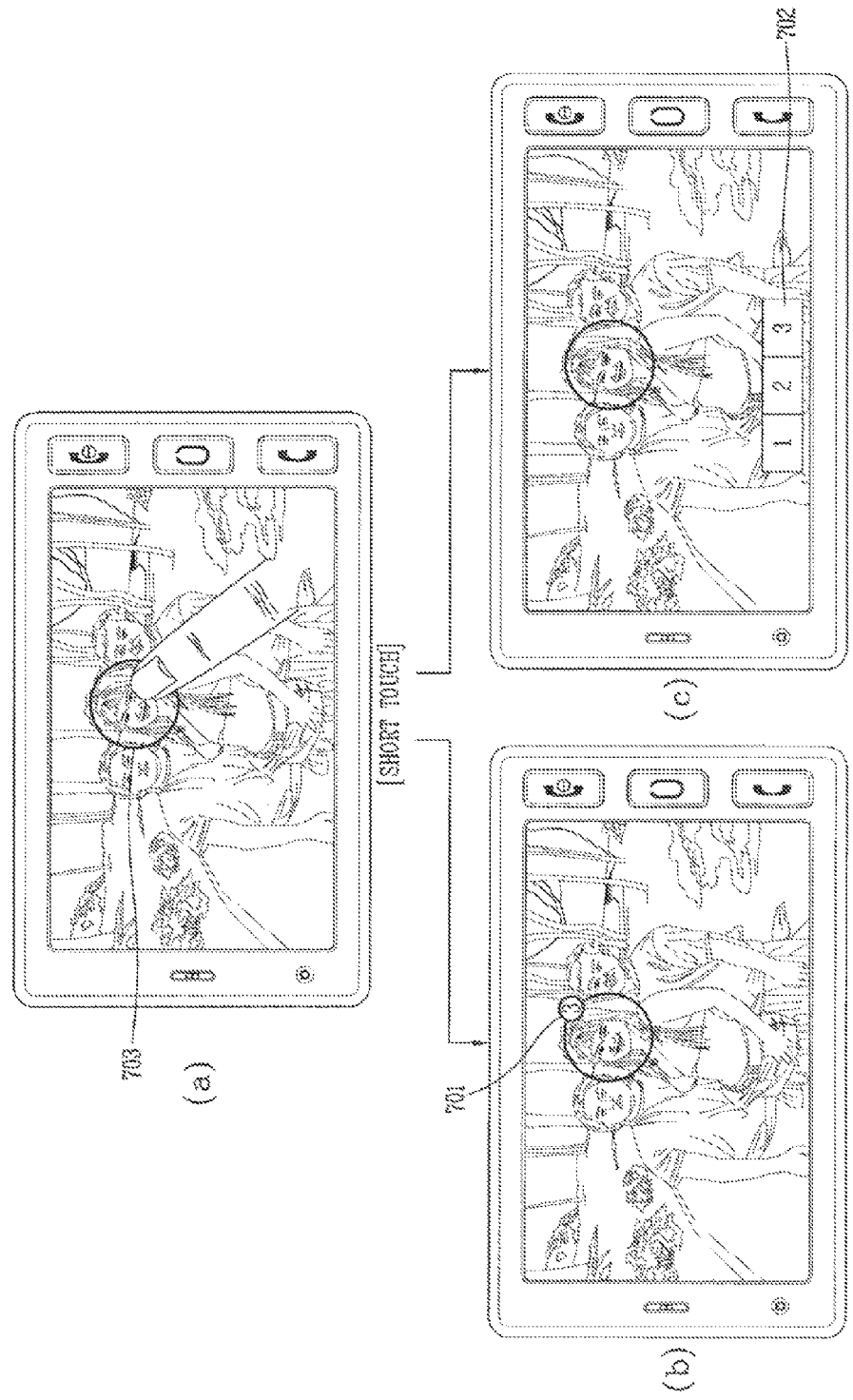

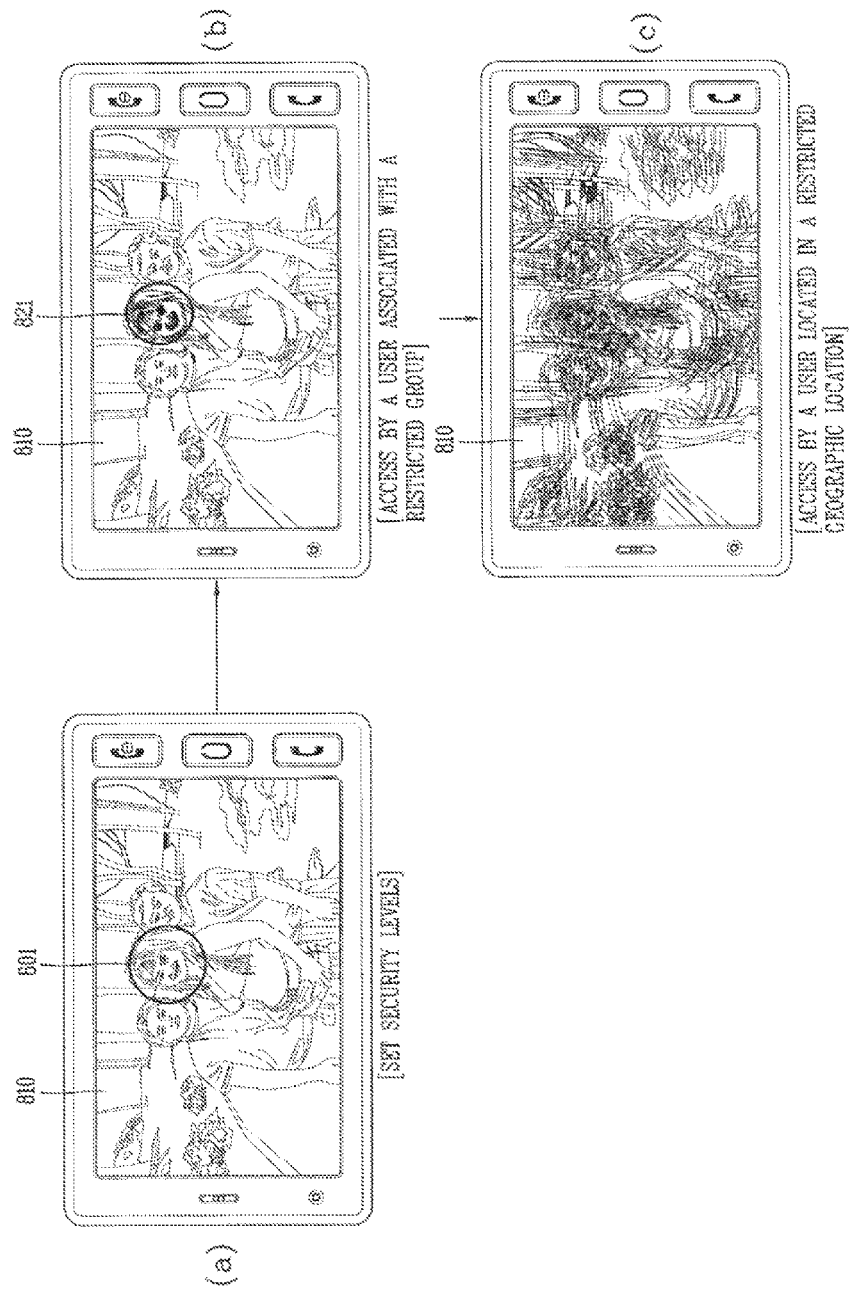

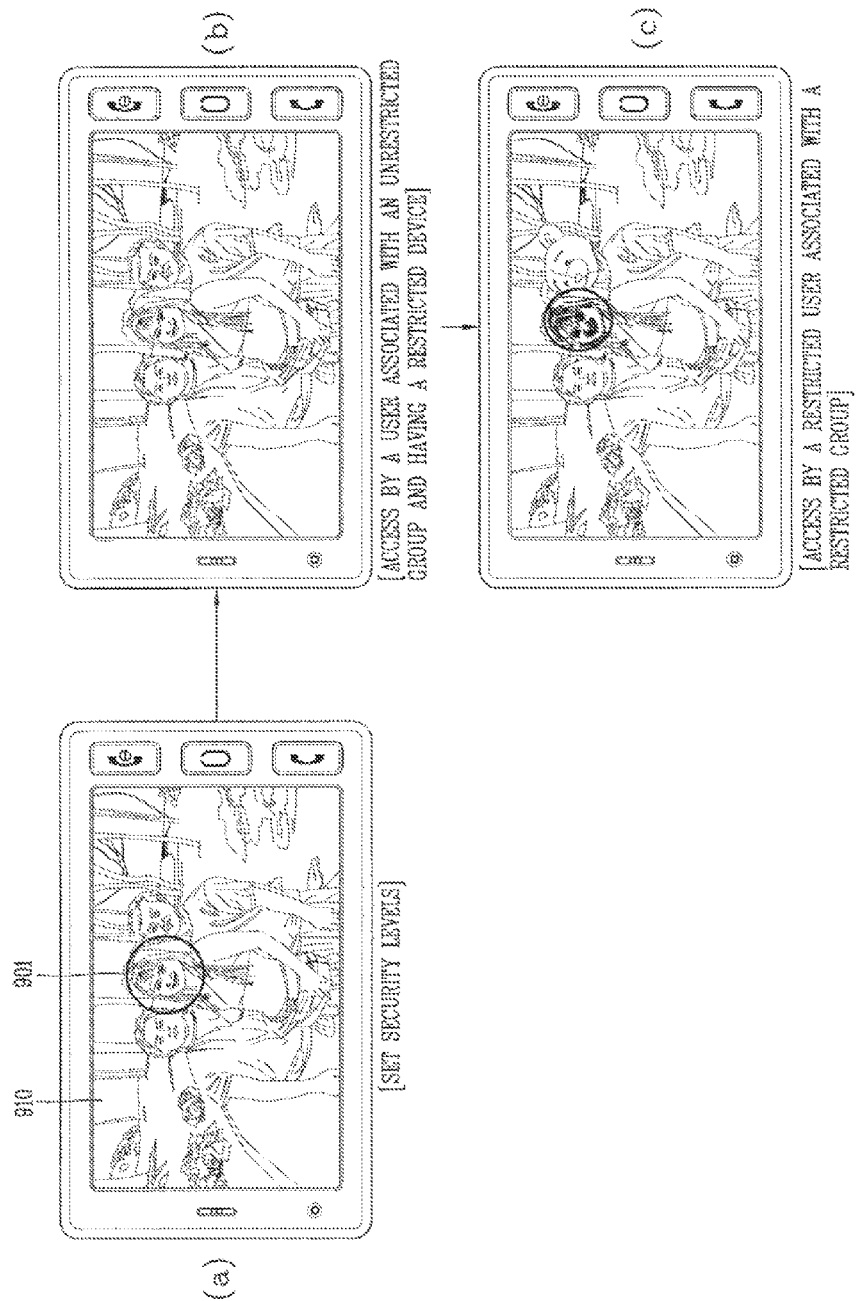

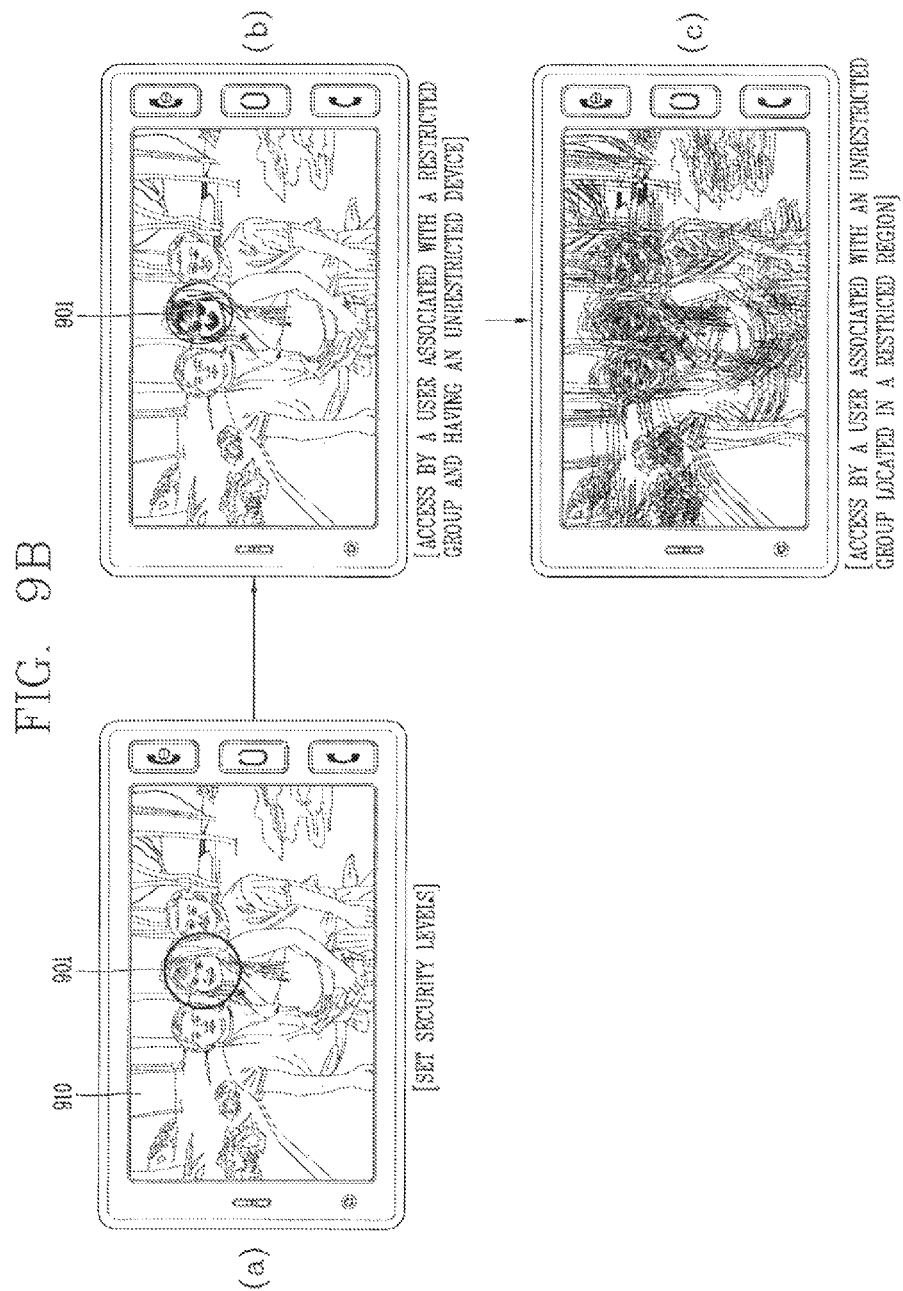

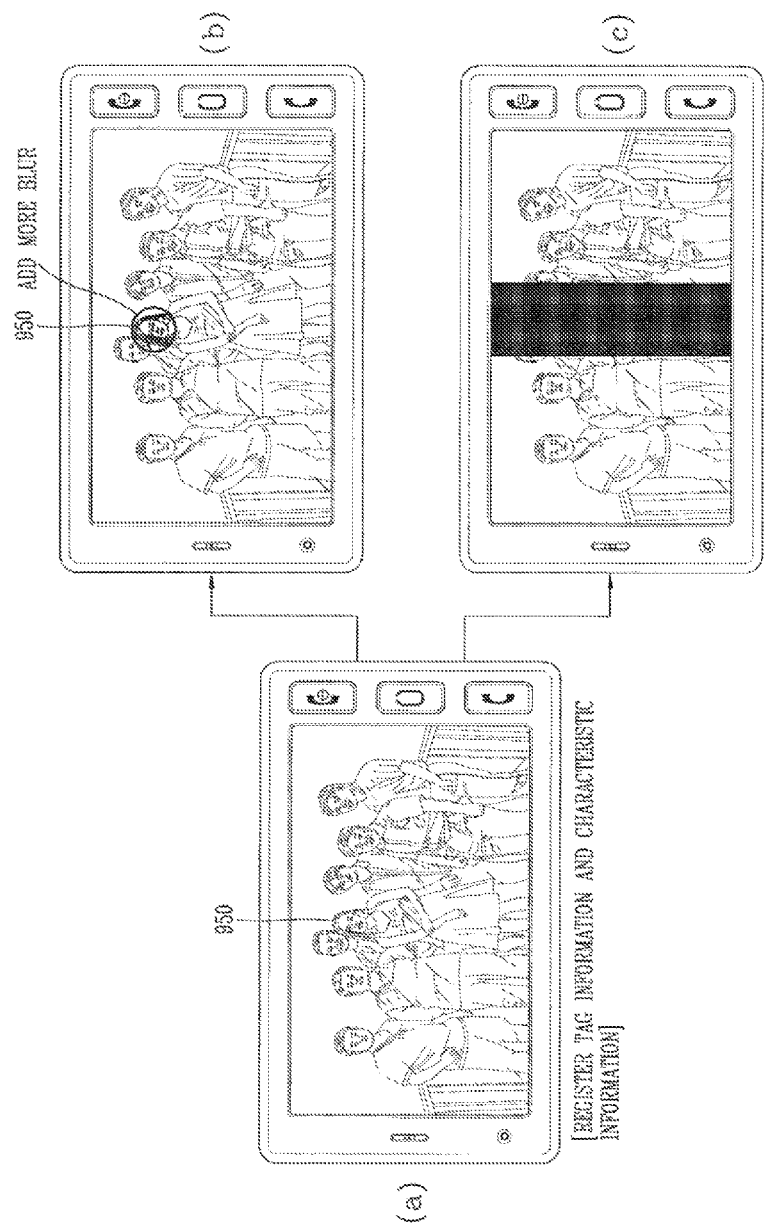

MOBILE TERMINAL AND INFORMATION SECURITY SETTING METHOD THEREOF

CROSS-REFERENCE TO RELATED APPLICATION

Pursuant to 35 U.S.C. §119(a), this application claims the benefit of earlier filing date and right of priority to Korean Application No. 10-2010-0085646, filed on Sep. 1, 2010, the contents of which are incorporated by reference herein in its entirety.

BACKGROUND OF THE INVENTION

1. Field of the Invention

The present invention is related to information security of a mobile terminal. Specifically, to a mobile terminal capable of setting a security level for information uploaded to a Social Network Service (SNS) site, and a security setting method thereof.

2. Discussion of the Related Art

A mobile terminal is a device which may be configured to perform various functions. Examples of such functions include data and voice communications, capturing images and video via a camera, recording audio, outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Efforts have been made to support or enhance various functions of mobile terminals. Such efforts include changes and improvements to the structural components implementing a mobile terminal in addition to software or hardware improvement.

A Social Network Service (SNS) is a community type web-based service for communication and information sharing with others. SNS sites include sites such as Twitter™, Facebook™, and Google+™. An SNS allows a user to share information with other users and allows the user to view information regarding other users. However the user is vulnerable to security risks in that a user's private information may be accessed without the user's permission.

SUMMARY

According to an embodiment, an information security method for a mobile terminal is presented. The method includes setting security information for a content associated with a first user, uploading the content to a Social Network Service (SNS) site, and uploading the security information to the SNS site to permit the SNS site to register the security information in order to display the content according to the security information when the content is accessed by a second user via the SNS site.

According to a feature, the content comprises a photo, a video, or text. Additionally, the information security method further includes setting content access rights for the second user in the security information.

According to another feature, the information security method further includes setting content access rights according to at least device information, identification (ID) information, internet protocol (IP) information, or position information for a device in the security information.

According to yet another feature, the information security method further includes setting the security information for an entirety of the content or a specific portion of the content.

According to still yet another feature, the information security method further includes setting the security information as a site-wide rule for an SNS site or for a specific group within an SNS site.

According to another feature, the information security method further includes setting the security information to pixelate, blur, blacken, or replace the content when accessed by the second user.

According to another embodiment, an information security setting method for a mobile terminal is presented. The method includes setting security information associated with a first user for a Social Network Service (SNS) site, and uploading the security information to the SNS site to permit the SNS site to apply the security information to content associated with the first user in order to display the content according to the security information when the content is accessed by a second user via the SNS site.

According to yet another embodiment, a mobile terminal is presented. The mobile terminal includes a controller configured to set security information for content associated with a first user, and a wireless communication unit configured to upload the content and the security information to a Social Network Service (SNS) site to permit the SNS site to display the content according to the security information when a second user accesses the uploaded content via the SNS site.

According to still yet another embodiment, a mobile terminal is presented. The mobile terminal includes a controller configured to set security information for a first user, and a wireless communication unit configured to upload the security information to a Social Network Service (SNS) site to permit the SNS site to apply the security information to content associated with the first user in order to display the content according to the security information when a second user accesses the content associated with the first user via the SNS site.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

FIGS. 6A to 6C illustrate examples of a security level menu according to an embodiment of the present invention.

FIG. 7 illustrates an example for applying a security level according to an embodiment of the present invention.

FIGS. 8A and 8B illustrate examples of applying a security level according to an embodiment of the present invention.

FIGS. 9A and 9B illustrate examples of applying a security level according to an embodiment of the present invention.

FIG. 10 illustrates an example of applying a security level according to an embodiment of the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes "module," "unit," and "part" are used for elements in order to facilitate the disclosure only. Therefore, significant meanings or roles are not given to the suffixes themselves and it is understood that the "module," "unit," and "part" can be used together or interchangeably.

Mobile terminals described in this disclosure can include a mobile phone, a smart phone, a laptop computer, a digital broadcast terminal, a PDA (personal digital assistant), a PMP (portable multimedia player), and a navigation system.

Except where applicable to a mobile terminal only, it will be appreciated by those skilled in the art that features described herein with reference to one or more embodiments may be applicable to a stationary terminal such as a digital TV, or a desktop computer.

Figure 1:
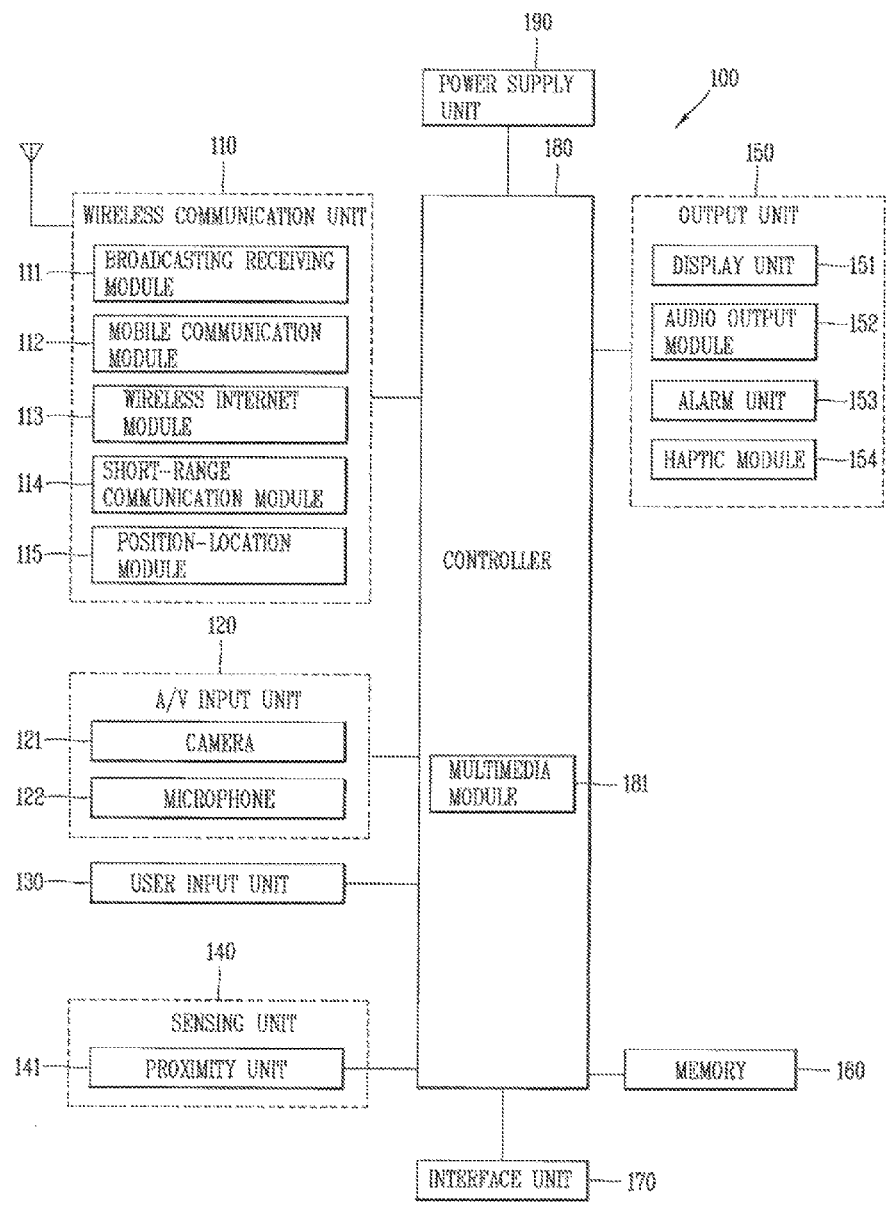
FIG. 1 illustrates a block diagram of a mobile terminal according to an embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in a suitable device, such as a memory 160.

The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of a digital multimedia broadcasting (DMB) system and an electronic service guide (ESG) of a digital video broadcast-handheld (DVB-H).

The broadcast receiving module 111 may be configured to receive broadcast signals transmitted from various types of broadcast systems. By nonlimiting example, such broadcasting systems may include a digital multimedia broadcasting-terrestrial (DMB-T) system, a digital multimedia broadcasting-satellite (DMB-S) system, DVB-H, the data broadcasting system known as media forward link only (MediaFLO™) and an integrated services digital broadcast-terrestrial (ISDB-T) system. Optionally, the broadcast receiving module 111 can be configured to be suitable for other broadcasting systems as well as the above-noted digital broadcasting systems.

The mobile communication module 112 transmits/receives wireless signals to/from one or more network entities (e.g., a base station, an external terminal, and/or a server). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), and HSDPA (High Speed Downlink Packet Access).

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes (or produces) image frames of still pictures or video, which are obtained by an image sensor in a video call mode or a photographing mode. Furthermore, the processed image frames can be displayed on the display unit 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition mode. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply 190, and the presence or absence of a coupling or other connection between the interface unit 170 and an external device. According to one embodiment, the sensing unit 140 can include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates output relevant to the senses of sight, hearing, and touch. Furthermore, the output unit 150 includes the display unit 151, an audio output module 152, an alarm unit 153, a haptic module 154, and a projector module 155.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented as a transparent or optically transmissive type, i.e., a transparent display. A representative example of the transparent display is a TOLED (transparent OLED). A rear configuration of the display unit 151 can be implemented as the optically transmissive type as well. In this configuration, a user may be able to see an object located at the rear of a terminal body on a portion of the display unit 151 of the terminal body.

At least two display units 151 can be provided in the mobile terminal 100 in accordance with one embodiment of the mobile terminal 100. For instance, a plurality of display units can be arranged to be spaced apart from each other or to form a single body on a single face of the mobile terminal 100. Alternatively, a plurality of display units can be arranged on different faces of the mobile terminal 100.

If the display unit 151 and a sensor for detecting a touch action (hereinafter called 'touch sensor') is configured as a mutual layer structure (hereinafter called 'touchscreen'), the display unit 151 is usable as an input device as well as an output device. In this case, the touch sensor can be configured as a touch film, a touch sheet, or a touchpad.

The touch sensor can be configured to convert pressure applied to a specific portion of the display unit 151 or a variation of capacitance generated from a specific portion of the display unit 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display unit 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor 141.

In the following description, for purposes of clarity, an action in which a pointer approaches the touchscreen without contacting the touchscreen will sometimes be referred to as a "proximity touch." Furthermore, an action in which a pointer actually touches the touchscreen will sometimes be referred to as a "contact touch." The position on the touchscreen that is proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations thereof.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects in addition to the vibration. For instance, the haptic module 154 may generate an effect attributed to an arrangement of pins vertically moving against a contacted skin surface, an effect attributed to an injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with one embodiment of the mobile terminal 100.

The projector module 155 is an element for performing an image projector function using the mobile terminal 100. The projector module 155 is able to display an image, which is identical to or at least partially different from the image displayed on the display unit 151, on an external screen or wall according to a control signal of the controller 180.

In particular, the projector module 155 can include a light source generating light (e.g., a laser) for projecting an external image, an image producing means for producing an external image to project using the light generated from the light source, and a lens for enlarging the external image according to a predetermined focal distance. Furthermore, the projector module 155 can further include a device for adjusting an image projection direction by mechanically moving the lens or the whole module.

The projector module 155 can be a CRT (cathode ray tube) module, an LCD (liquid crystal display) module, or a DLP (digital light processing) module according to a device type. In particular, the DLP module is operated by enabling the light generated from the light source to reflect on a DMD (digital micro-mirror device) chip and can be advantageous for reducing the size of the projector module 155.

In many configurations, the projector module 155 can be provided in a lengthwise direction of a lateral, front or backside direction of the mobile terminal 100. Furthermore, it is understood that the projector module 155 can be provided in any portion of the mobile terminal 100 as deemed necessary.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, or XD memory), or other similar memory or data storage device. Furthermore, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identity Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
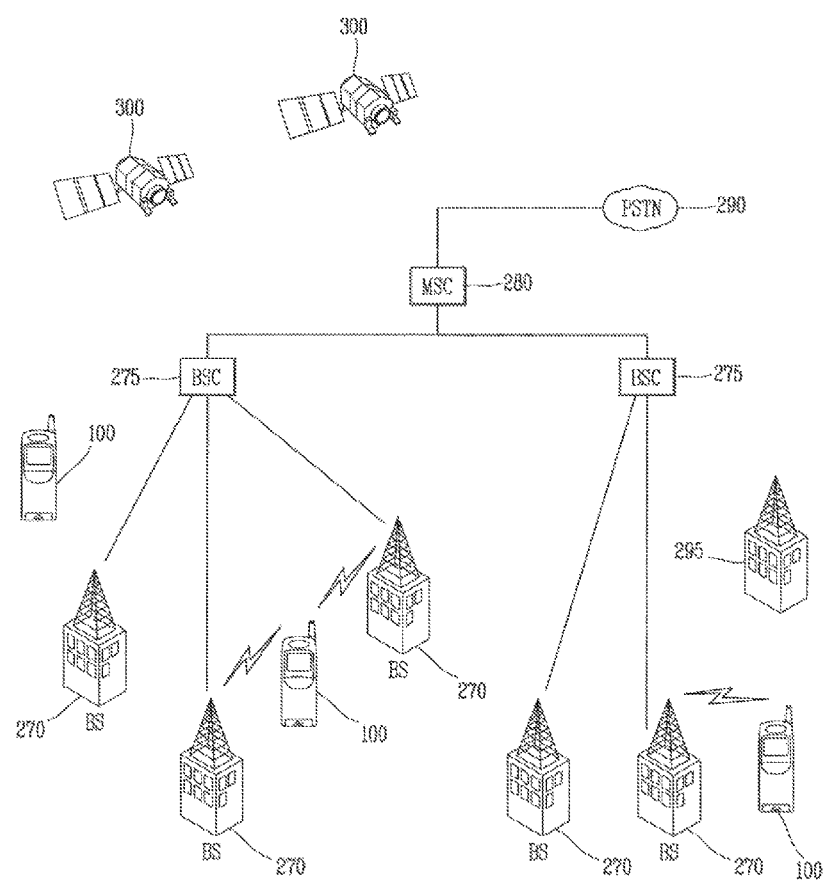
FIG. 2 illustrates a block diagram of a mobile communication system operating with the mobile terminal according to an embodiment of the present invention.

As illustrated in FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The system as shown illustrated in FIG. 2 may include a plurality of BSCs 275.

The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL.

Each BS 270 may serve one or more sectors or regions, each sector or region covered by an omni-directional antenna or an antenna pointed in a particular direction radially away from the BS 270. Alternatively, each sector or region may be covered by two or more antennas for diversity reception. Each BS 270 may be configured to support a plurality of frequency assignments, with each frequency assignment having a particular spectrum, such as 1.25 MHz or 5 MHz The intersection of a sector and frequency assignment may be referred to as a CDMA channel. The BS 270 may also be referred to as base station transceiver subsystems (BTSs) or other equivalent terms.

The term "base station" may be used to collectively refer to a single BSC 275 and at least one BS 270. The base station may also be referred to as a "cell site." Alternatively, individual sectors of a particular BS 270 may be referred to as a plurality of cell sites.

As illustrated in FIG. 2, a broadcasting transmitter (BT) 295 transmits a broadcast signal to the mobile terminals 100 operating within the system. The broadcast receiving module 111 is provided in the mobile terminal 100 to receive broadcast signals transmitted by the BT 295.

FIG. 2 illustrates several global positioning system (GPS) satellites 300. The GPS satellites 300 help locate at least one of a plurality of mobile terminals 100. Although several GPS satellites 300 are depicted in FIG. 2, it is understood that useful positioning information may be obtained with any number of GPS satellites. The Location information module 115 is typically configured to cooperate with the GPS satellites 300 to obtain desired positioning information.

Instead of or in addition to GPS tracking techniques, other technologies to track the location of the mobile terminals 100 may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engage in calls, messaging, and other types of communications. Each reverse-link signal received by a particular base station 270 is processed within the particular BS 270. The resulting data is forwarded to an associated BSC 275.

The BSC 275 provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Embodiments of the present invention provide a method for setting a security level on an SNS. Accordingly, content which is to be uploaded in an SNS may include information regarding a security level associated with access rights for the content. The access rights may be based on user information, device information, location information, or other information associated with an SNS. The display of the content may be censored for various users according to the security level associated with the content. For example, the entire content or portions of the content may be uniquely processed, such as being pixelated, blurred, or blacked. Furthermore, access to the content may be entirely denied. The setting for how to display the content, such as pixelated, blurred, or blacked, may be determined by each SNS site or may be set via the security level.

According to other embodiments of the present invention, tag information, sometimes referred to as characteristic information, may also be registered in an SNS site. The tag information may be registered with or without separately setting a security level for content. The registered tag information may automatically be stored in an SNS site or a terminal belonging to the another user. The stored tag information may function as a type of security information. For example, a second user may not be permitted to capture the user's face or a particular region of the user's face may be differently displayed when a user's tag information has been registered with an SNS site.

Figure 3A:
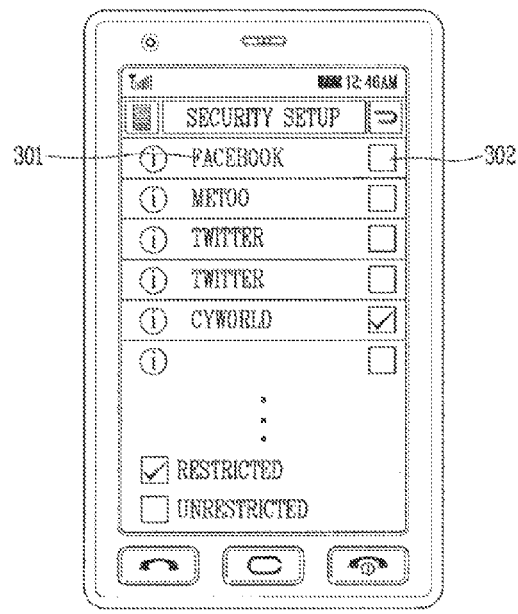
FIGS. 3A and 3B illustrate a menu for setting a security level for content according to an embodiment of the present invention.
Figure 3B:
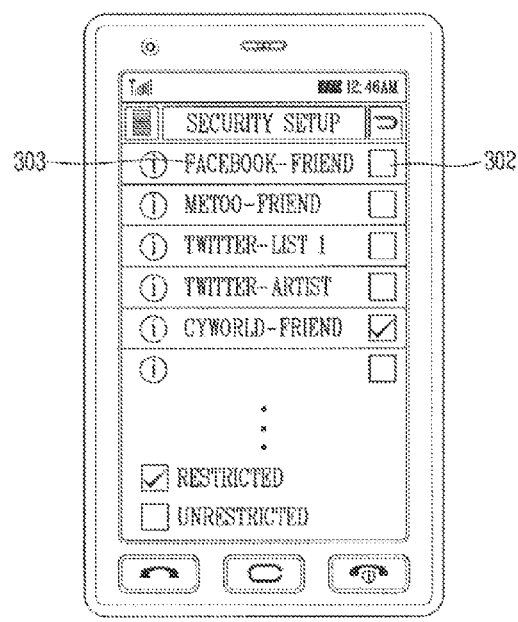

FIGS. 3A and 3B illustrate menus for setting a security level according to an embodiment of the present invention. FIG. 3A illustrates an example of setting a security level for each SNS site. FIG. 3B illustrates an example of setting a security level for groups in an SNS site. The method of setting a security level for groups in an SNS site (FIG. 3B) allows for a greater level of detail in comparison to a site wide security level (FIG. 3A).

As illustrated in FIG. 3A a security setup menu may be utilized to set a security level for an SNS site. The security setup menu may include at least one SNS site 301 and a check box 302 for setting a security level. For example, an unchecked box may be associated with an unrestricted security level and a checked box may be associated with a restricted security level.

Similar to FIG. 3A, FIG. 3B illustrates a security setup menu to set a security level for groups within an SNS site. The security setup menu may include at least one SNS group 303 and a check box 302 for setting a security level. For example, an unchecked box may be associated with an unrestricted security level and a checked box may be associated with a restricted security level. The SNS sites and SNS groups included in the security setup menu illustrated in FIGS. 3A and 3B may be added/deleted according to a user selection. Furthermore, a security setup menu may include both an SNS site 301 and an SNS group 303 (not shown).

In many configurations the security level is set to restricted or unrestricted. However, the security level is not limited to restricted and unrestricted, other security levels may be applied as necessary.

Upon setting the security level via the security setup menu, the controller 180 may automatically recognize a user's face in the corresponding content and apply the appropriate security level. Alternatively, the security level may be associated with content tagged by a user. Other methods of tagging content may include recognizing a user's name or other data associated with a user.

Figure 4:
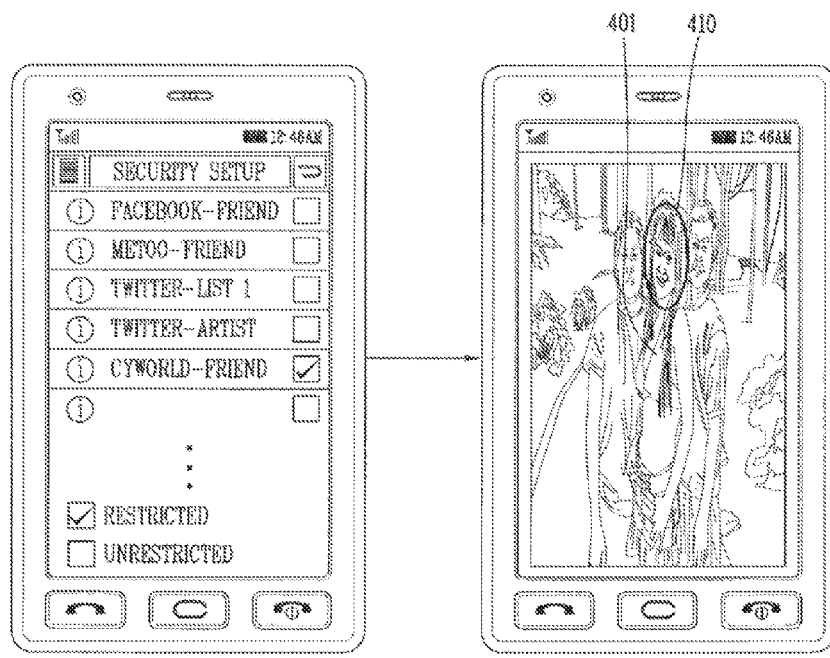
FIG. 4 illustrates a screen displayed after setting a security level according to an embodiment of the present invention.

FIG. 4 illustrates an example of a screen displayed after setting a security level for content according to an embodiment of the present invention. As illustrated in FIG. 4, when a first user 401 selects a restricted security level for a group in the security setup menu (FIG. 3B), the controller 180 may automatically recognize the face of the first user and apply the appropriate security level to the content. An indicator 410, such as a circle, may indicate that the security level has been applied to the content or a portion of the content.

In many configurations the security level is concurrently registered with the SNS site when the content is uploaded to the SNS site. However, the security level may be registered with the SNS prior to uploading the content or after uploading the content. Alternatively, a user may apply a security level to content which has already been uploaded to the SNS site. Finally, the security level is executed in response to access of the content on the SNS site.

For example, when a second user accesses content, such as a photo, associated with the first user, a server of the SNS site may decode the corresponding content according to the security level set by the first user. Thus, when the decoded content associated with the first user is displayed, a specific portion, such as a user's face, may be censored according to the set security level. The censorship may include, but is not limited to, pixelating, blurring, or blacking out the specific portion, moreover the censorship may include superimposing a character or an image on the specific portion. The content associated with a user refers to content which includes information regarding the user, such as a picture which includes the user's image or text which mentions the user.

Figure 5:
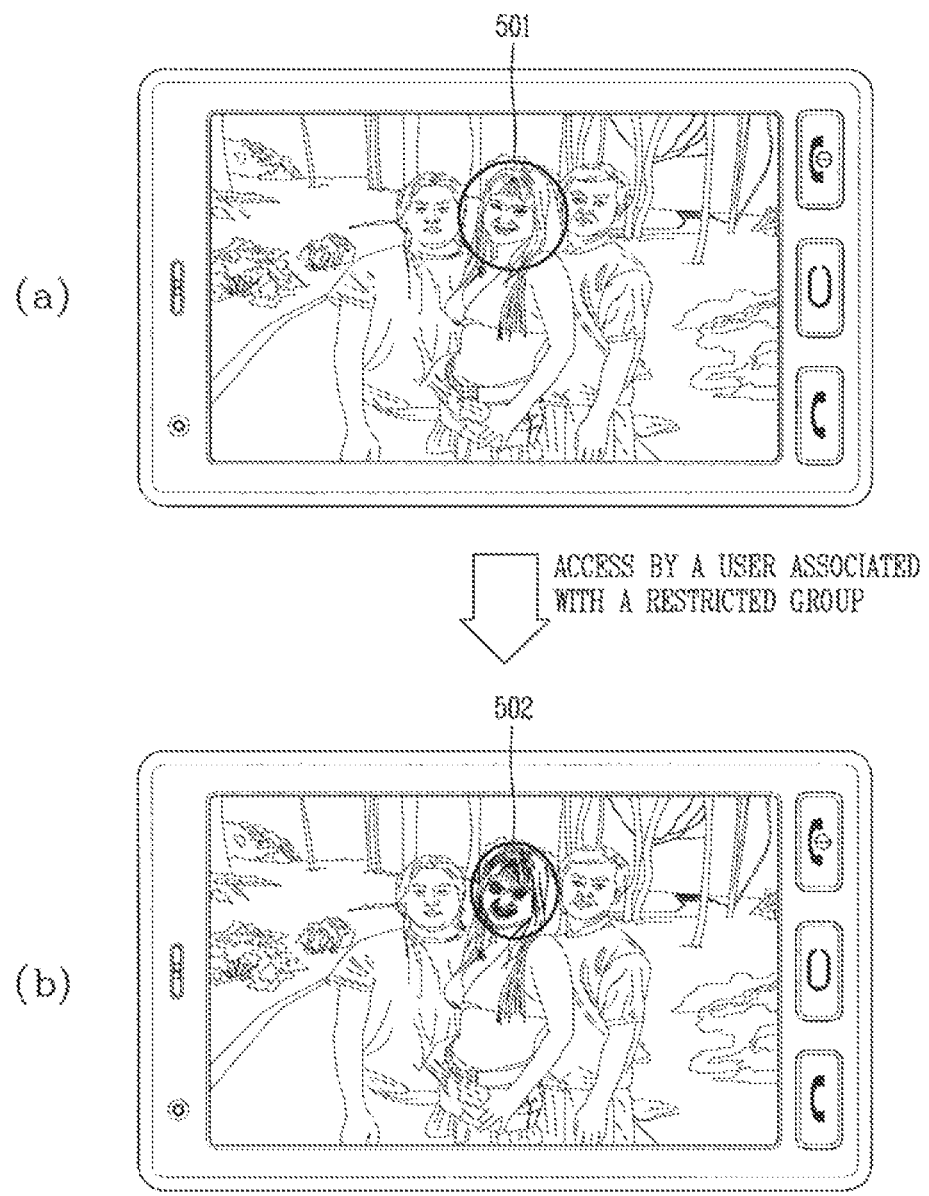
FIG. 5 illustrates an example of applying a security level according to an embodiment of the present invention.

FIG. 5 illustrates an example of applying a security level to content associated with a user. A user may set a security level to a restricted setting for a group on a SNS site, for example, the user may restrict content viewed by a cyworld-friend group (FIG. 3B). When a second user belonging to the group associated with a restricted setting accesses the content, a face of the user associated the content may be censored. As illustrated in FIG. 5(*a*), the first user's face 501 is not censored in an unrestricted state, however, the first user's face 502 may be censored when a user associated with a restricted group accesses the content associated with the first user (FIG. 5(*b*)).

According to an embodiment of the present invention, the restricted setting for a security level is configured to censor a user's face via facial recognition methods. Accordingly, other methods may be employed in order to set restrictions on content. For example, according to another embodiment of the present invention, a security level may be set for the entire content or for only specific portions of the content. When multiple security levels are set for a specific content, the content may be decoded according to the priority level for each of the multiple security levels.

Figure 6A:
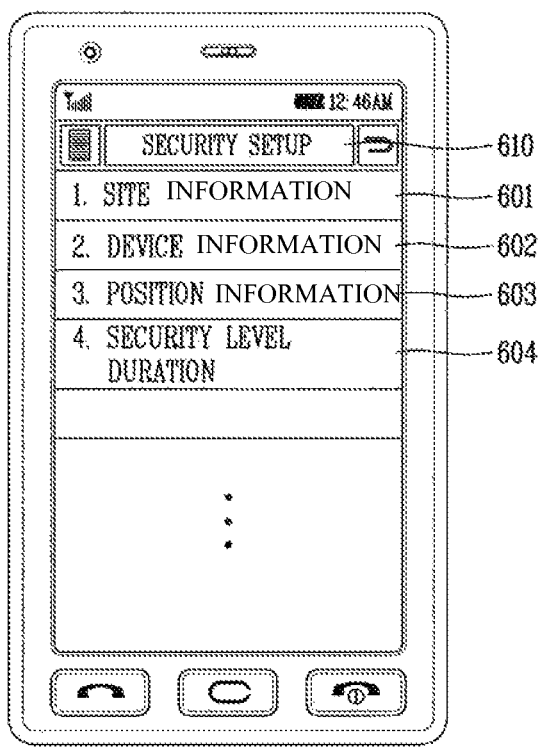

FIG. 6A illustrates a security setup menu 610 for setting a security level for content according to an embodiment of the present invention. As illustrated in FIG. 6A, the security setup menu may include items such as site information 601, device information 602, position information 603, and security level duration 604. Furthermore, although not shown, the security menu may include items for checking a set security level or for checking a state of the set security level. The formation and number of the items included in the security setup menu 610 may be adjusted according to user requirements.

The site information 601 sets a security level on a site wide basis or according to groups associated with individual SNS sites. The site information menu is similar to the menu illustrated in FIGS. 3A and 3B.

The device information 602 sets a security level according to a device type. For example, the security level may vary according to whether a device accessing the content is a mobile terminal or a personal computer (PC). Moreover, the security level may be set according to whether a PC is a private PC or a shared PC. The device information security level utilizes device information such as hardware or software characteristics, IP information, and other device specific information.

The position information 603 sets a security level according to various zones or locations. For example, the security level may vary according to a physical location of a user attempting to access the content. The physical location may include a city, town, country, or other geographic location.

The security level set duration 604 may set a duration for a security level. For example, a restricted setting for a content may be set for only a month.

Figure 6C:
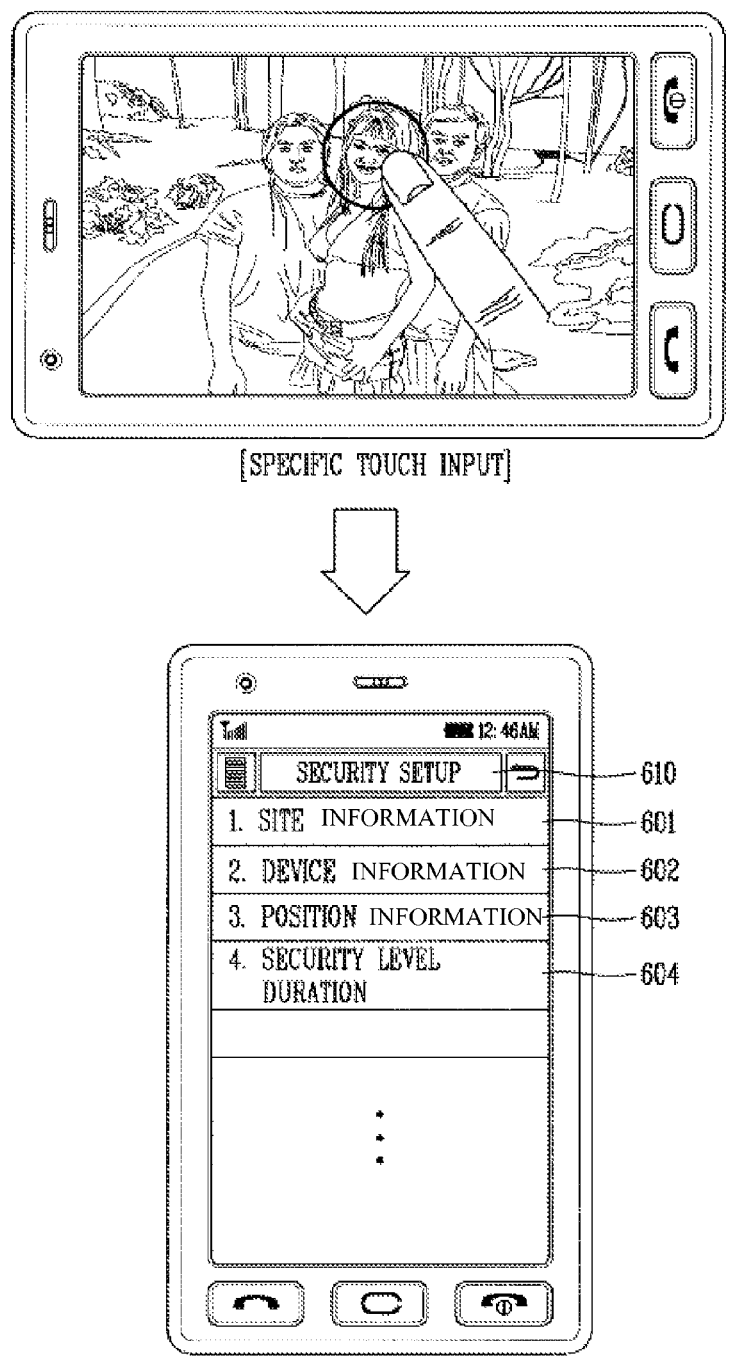

The security setup menu 610 may be displayed as a pop-up window in response to tagging the content (FIG. 6B). Alternatively, the security setup menu 610 may be included in a user menu. Moreover, the security setup menu 610 may be displayed in response to a specific touch input, such as a long touch or double touch (FIG. 6C).

Referring to FIG. 7, the set security level may be displayed on a predetermined area of a screen in response to an input on the content. For example, the set security level may be displayed in response to an input on a tagged portion 703 of the content (FIG. 7(*a*)). The set security level may be displayed in a block form (not shown). Alternatively, the set security level may be displayed as a text or numeral 701 adjacent to a tagged portion of the content (FIG. 7(*b*)). Finally, a scroll bar may be displayed to allow a user to search the security levels when multiple security levels have been set for the displayed content (not shown).

Furthermore, a security setup menu 702 may be displayed on a predetermined area (FIG. 7(*c*)). The security setup menu 702 may display numbers corresponding to different menu items or different security levels. Accordingly, a user may change a preset security level by selecting a number displayed on the security setup menu 702.

The process of applying the security level when content is accessed on an SNS site is similar to the process disclosed with regard to FIGS. 4 and 5.

Figure 8A:
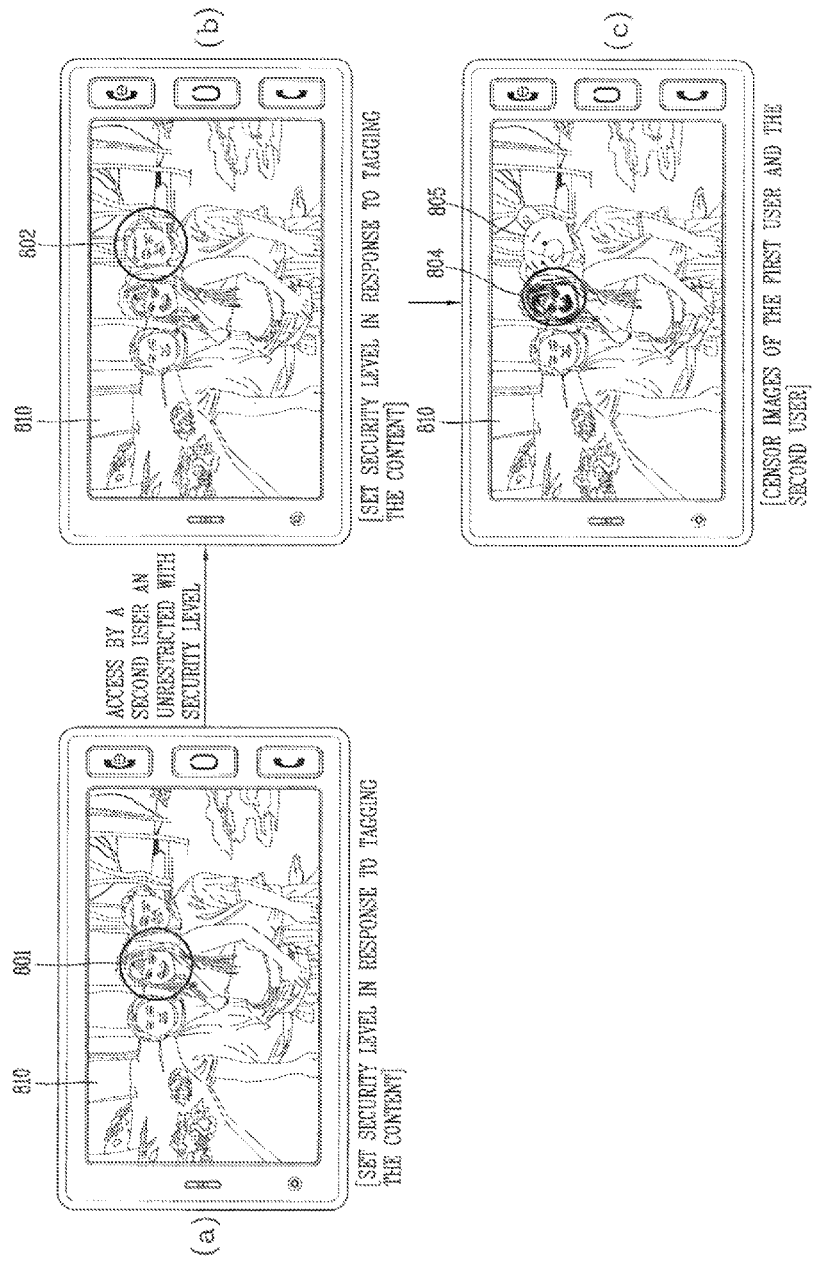

FIG. 8A illustrates an example of applying a security level for content according to an embodiment of the present invention. In response to a first user tagging a content 810 (FIG. 8A(*a*)), a user may set a security level according to a method described in relation to FIGS. 6A to 6C. For example, the first user may set a group associated with a specific SNS site to a restricted setting, furthermore, the user may set a security level for the position information 603.

For example, the user may set the security level for a Facebook Classmate group to restricted and the security level for the position information as unrestricted for only a domestic location. Once the various security levels have been set, the first user may upload the content to an SNS site, and the security level will be registered within the SNS site. For example purposes, the first user will have uploaded the content to Facebook and the security level will be registered with Facebook.

In this example, a domestic location setting may refer to a user located in the same geographic location, such as a city, state, or country, as the first user. In many configurations, setting an unrestricted setting for only a specific location will result in all other locations being set as restricted. However, the position information is not limited to only being unrestricted to a specific location. In some embodiments a user may set some locations with a restricted setting while setting other locations with an unrestricted setting.

Once the content 810 has been uploaded to Facebook, other Facebook users may view the content. Additionally, other users may tag the content 810 via Facebook. For example, a second user may tag the content 810. In this example, the second user may belong to a Facebook group which has an unrestricted security level, and therefore, the second user may have an uncensored view of the content 810 (FIG. 8A(b)). Since the second user is in an unrestricted group, the second user may tag the content 810, in other words, a user associated with a restricted security level may not tag content.

Accordingly, in response to setting a tag 802 on the content 810, the second user may set additional security levels for the content 810. For example, the second user 802 may set a security level to designate a third user as having a restricted security level. Thus, according to the present example, the content 810 uploaded by the first user would have three different security levels.

Thus, for example, when the third user, who is a member of a Facebook Classmate group, attempts to view the content 810, the server may censor both the image of the first user and the second user. Specifically, the image of the first user is censored because the first user had set the security level for members of the Facebook Classmate group to restricted. Additionally, the image of the second user is censored because the second user had set the security level for the third user to restricted.

FIG. 8B illustrates an example of applying a security level set for content according to an embodiment of the present invention. As discussed with regard to FIG. 8A, content 810 uploaded by the first user may have a security level for a Facebook Classmate group set to restricted and may have a position information as unrestricted for only domestic access (FIG. 8B(a)).

According to the present example, when a second user associated with the Facebook Classmate group accesses the content 810, a Facebook server decodes the corresponding content according to the set security levels and censors the output of the content 810. Accordingly, the image of the first user 801 is blurred when viewed by the second user (FIG. 8B(b)).

Furthermore, when a third user who is not located in an area which is in the same domestic region as the first user accesses the content 810, the server identifies the location of the third user and censors the entire content 810 (FIG. 8B(c)). The location of the third user may be determined according to IP information or GPS information of the terminal. In this example, the entire photo is blurred because the security level for the position information has a higher priority than the security level for groups associated with an SNS. The priority for the security levels may be set by a user or preset by each SNS.

FIGS. 9A and 9B illustrate an example of applying a security level according to priority levels. Similar to the embodiment described with regard to FIG. 8A, content 910 uploaded by the first user 901 may have a security level for a Facebook Classmate group set to restricted and a position information set to unrestricted for only domestic access (FIG. 9A). Furthermore, the content 910 is set with an additional security level of restricted when the content is accessed by a shared PC (FIG. 9A).

According to the present example, when a second user using a shared PC who is associated with an unrestricted group accesses the content 910, a SNS server decodes the corresponding content according to the set security levels and does not censor the output of the content 910 (FIG. 9A(b)). Specifically, as illustrated in FIG. 9A(b) the content 910 is not censored because the security level set for the SNS group has a higher priority in comparison to the security level set for the device information 602. In other words, the unrestricted SNS group setting trumps the restricted shared PC setting.

Additionally, since the second user has unrestricted access, the second user may set a security level which designates a third user as having a restricted security level. Thus, according to the present example, the content 910 uploaded by the first user would have four different security levels.

Accordingly, when the third user, who is a member of a Facebook Classmate group, attempts to view the content 910, the server may censor the image of the first user and the second user. Specifically, the image of the first user is censored because the first user had set the security level for members of the Facebook Classmate group to restricted. Additionally, the image of the second user is censored because the second user had set the security level for the third user to restricted.

With regard to FIG. 9B, content 910 uploaded by the first user may be set to have a security level for a Facebook Classmate group set to restricted, position information as unrestricted for only domestic access, and device information as restricted for shared PCs.

According to the present example, when a second user associated with the Facebook Classmate group access the content 910 via a terminal which is set with unrestricted access, such as a private PC, a Facebook server decodes the corresponding content according to the set security levels and censors the output of the content 910. Accordingly, the image of the first user 901 is blurred when viewed by the second user since the second user is associated with a restricted SNS group (FIG. 8B(b)). As previously discussed, the security level set for the SNS group has a higher priority in comparison to the security level set for the device information.

Furthermore, when a third user associated with an unrestricted group and located in an area which is not in the same domestic region as the first user accesses the content 910, the server identifies the location of the third user and censors the entire content (FIG. 9B(c)). The location of the third user may be determined according to IP information or GPS information of the terminal utilized by the third user. In this example, the entire photo is blurred because the security level for the position information has a higher priority than the security level for groups associated with a SNS.

As discussed with regard to the various embodiments, when several security levels are set for a specific content, priorities for applying the corresponding security levels to the content may be defined and the security levels may be applied according to the defined priorities.

The method for setting security levels has thus far been described with regard to setting a security level for each content or specific portions of each content. Additionally, it is often useful to provide a method of setting the security levels for all content associated with a user as opposed to setting a security level for each content.

According to an embodiment of the present invention, a first user may register a desired security level with an SNS site. Additionally, the desired security level may be stored on the SNS site or may be stored on terminal associated with a second user. Thus, when the second user visits the SNS site associated with the first user, the stored security levels may be applied to the content associated with the first user. Additionally, the security levels may be applied when the second user attempts to upload content associated with the first user.

In this example the security level may be associated with a user's tag information, such as a user's face, or a user's personal data, such as a user's phone number, user ID, email address, or home address. The security level sent to the second user may be a user's tag information as to prevent unauthorized access to a user's personal data. Accordingly, when the second user accesses content associated with the first user or uploads content associated with the first user, the tag information and personal data associated with the first user are recognized and thereafter the information associated with the first user, such as the user's face, may be censored or access to the content may be completely denied.

FIG. 10 illustrates an example of applying a security level according to tag information and personal data according to an embodiment of the present invention. As illustrated in FIG. 10, a first user 950 registers tag information, such as information related to a user's face, and personal data including a phone number, an email address, or other information in an SNS site such as Twitter. When a second user visits the SNS site associated with the first user, the registered tag information may be stored on terminal belonging to the second user.

In this example, assuming that the second user has restricted access to content associated with the first user, when the second user downloads or views content associated with the first user via the SNS site, a server or the controller 180 determines that the content is associated with the first user according to tag information, such as the first user's face, or personal data and censors the content. As illustrated in FIG. 10(b) the censorship may comprise blurring the face of the first user 950.

According to this example, the security level according to the tag information or personal data may include the same security level settings disclosed with regard to the embodiments illustrated in FIGS. 6-9. For example, the security level may be set according to site information, device information, or position information.

In one example, the user may set a security level for position information to restricted for a location, such as Las Vegas. Thus, when the second user captures an image of the first user in the restricted location (Las Vegas), the mobile terminal 100 first determines that the captured image is associated with the first user via tag information or personal data, and then determines that the image was captured in a restricted location and censors the image. The location of the image capture is determined via GPS of other positioning methods.

Additionally, when the second user attempts to upload content associated with the first user or capture content associated with the first user, the controller 180 determines that the content is associated with the first user according to tag information, such as the first user's face, or personal data and censors or prevents the capture of the content. As illustrated in FIG. 10(c) the censorship may comprise blacking the entire image of the first user 950.

Figure 11:
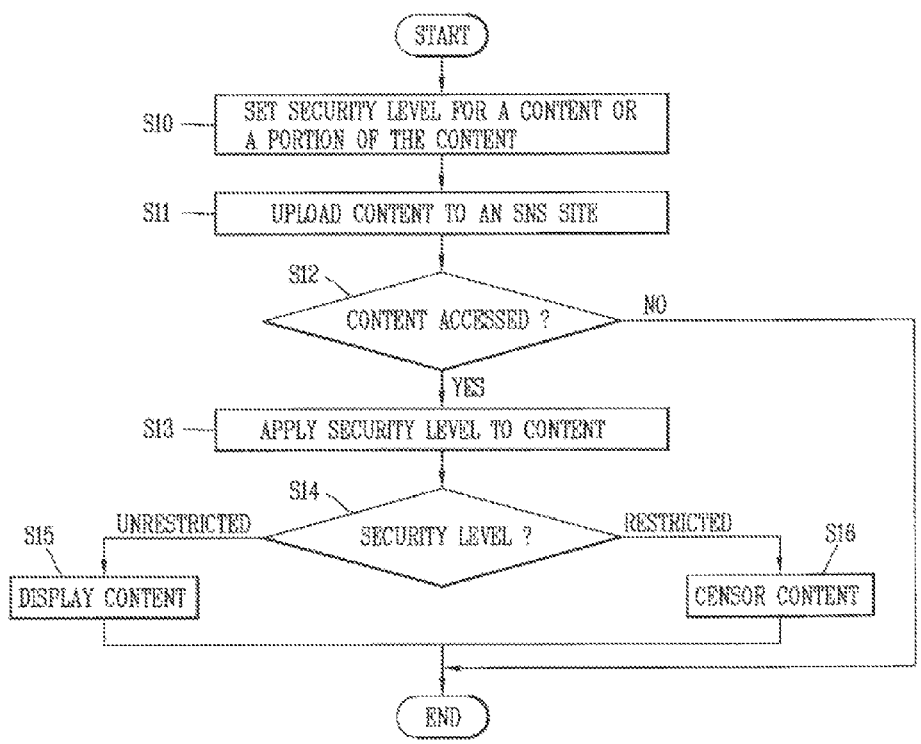
FIG. 11 is a flowchart illustrating a method for setting a security level on a mobile terminal according to an embodiment of the present invention.

FIG. 11 is a flowchart illustrating a security setting method for a mobile terminal according to an embodiment of the present invention. In many configurations, the method illustrated in FIG. 11 is applied when a user sets a security level directly to a content prior to uploading the content to an SNS site.

As illustrated in FIG. 11, a first user sets a security level for a content or a portion of the content (S10). The security level may be set automatically by the controller 810 via facial recognition or other techniques. Additionally, the security level may be set by the first user. In addition to setting a security level according to tag information or personal data, the first user may also set the security level according to at least, for example, site information, device information, or position information.

The set security level may be displayed on the display unit 151 to allow a user to check or adjust the security levels. The plurality of security levels may be displayable in a graphic form or a numeric form. The displayed order of the security levels may indicate the priority levels.

Once the security level has been set, the wireless communication unit 110 uploads the corresponding content to an SNS site, such as Twitter (S11). The security level is then registered with the site.

Once the content has been uploaded, when a second user attempts to access the content associated with the first user via the SNS site (S12), a server of the corresponding SNS site applies the security level set by the first user to the content (S13).

The server of the corresponding SNS site determines if the security level of the content is set to a restricted level or an unrestricted level for the second user (S14). If the security level for access by the second user is set to unrestricted, the content is displayed (S15), and the second user may view the content. However, if the security level for access by the second user is set to restricted, the content is censored (S16). Censorship of the content may refer to modifying the display of the content, such as pixelating or blurring the content. Alternatively the content may be censored such that content is not displayed.

Figure 12:
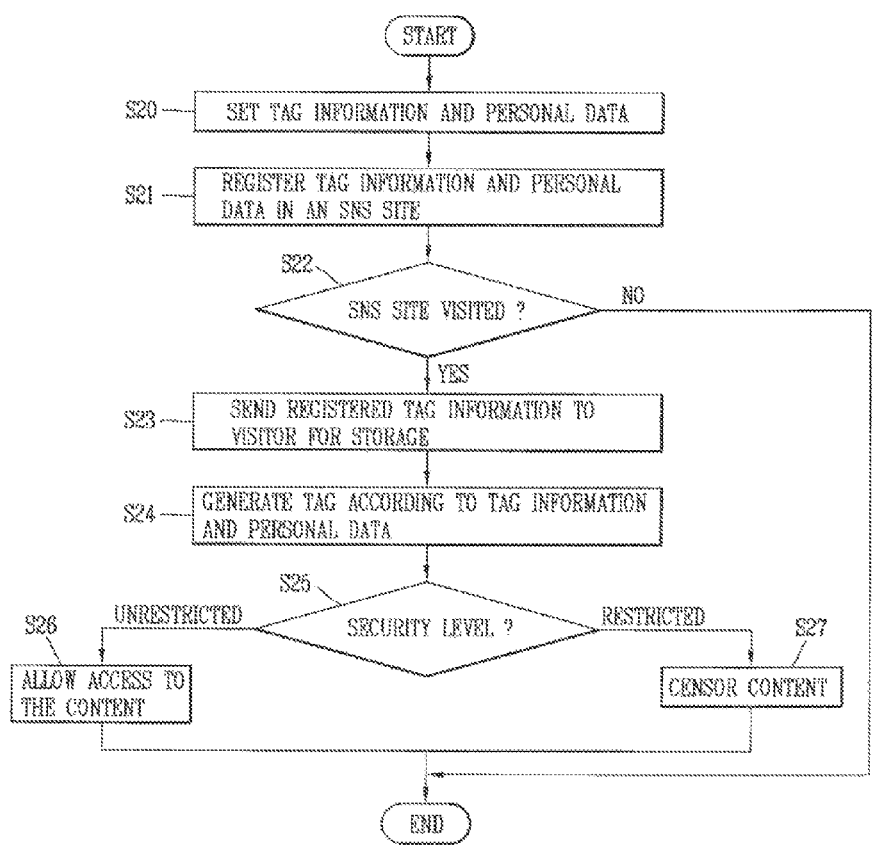
FIG. 12 is a flowchart illustrating a method for setting a security level on a mobile terminal according to an embodiment of the present invention.

FIG. 12 is a flowchart illustrating a security level setting method for a mobile terminal according to an embodiment of the present invention. In many configurations, the method illustrated in FIG. 12 is applied when a user sets security a security level on a SNS site or sends the security level directly to another user.

As illustrated in FIG. 12, a first user sets tag information and personal data in a mobile terminal (S20). The controller 180 then registers the set tag information and the personal data in an SNS site, such as Facebook, via the wireless communication unit 110 (S21).

When a second user attempts to access content associated with the first user via the SNS site, the SNS site may send the tag information to be stored in a terminal of the second user (S23).

In this example, when the second user downloads or views content associated with the first user, the server or controller 180 automatically generates tags for information associated with the first user, such as the user's face, a phone number, or an address corresponding to the tag information and the personal data (S24).

The server of the corresponding SNS site determines if the security level of the content is set to a restricted level or an unrestricted level for the second user (S25). If the security level for access by the second user is set to unrestricted, access to the content is allowed (S26), and the second user may view the content. However, if the security level for access by the second user is set to restricted, the content is censored (S27). Censorship of the content may refer to modifying the display of the content, such as pixelating or blurring the content. Alternatively the content may be censored such that content is not displayed.

Moreover, determining the security level of the content (S25) also determines if the security level for content is set to a site wide restricted or unrestricted setting and is not limited to determining the security level for a specific user.

In many configurations, when a user executes a content capturing menu, such as a camera, the controller 180 receives a preview image from a camera and displays the preview image on the display unit 151. The controller 180 may detect at least one face image from the preview image and stores the detected face image or characteristic information related to the detected face image. The characteristic information related to the face image may be encoded by terminal-specific information, such as at least one of an electronic serial number (ESN), a phone number, or subscriber identity module (SIM) information.

The various embodiments of the present invention illustrate the display as a horizontal display, however, the display is not limited to a horizontal display. A vertical display may also be displayed in the same manner.

The disclosed methods can be implemented in a program recorded medium as computer-readable codes. The computer-readable media may include all types of recording devices in which data readable by a computer system are stored. The computer-readable media may include ROM, RAM, CD-ROM, magnetic tapes, floppy discs, and optical data storage devices, and may also include carrier-wave type implementations, such as transmission via the Internet.

It will be apparent to those skilled in the art that various modifications and variations can be made in the present invention without departing from the spirit or scope of the present invention. Thus, it is intended that the present invention covers the modifications and variations of this invention provided they come within the scope of the appended claims and their equivalents.

What is claimed:

1. An information security method for a mobile terminal, the method comprising:
    selecting, at the mobile terminal, a specific portion of a content, wherein the content comprises the specific portion and a remaining portion, and wherein the specific portion is less than an entire portion of the content;
    setting, at the mobile terminal, security information for the selected portion of the content, the security information including multiple security levels,
    wherein each security level of the multiple security levels corresponds to a priority level of content access rights, wherein a first security level of the multiple security levels permits displaying of the specific portion of the content and the remaining portion of the content, without censoring, and wherein a second security level of the multiple security levels permits displaying of the remaining portion of the content without censoring and the displaying of the specific portion of the content with censoring; and
    uploading, from the mobile terminal, the content and the security information to a Social Network Service (SNS) site to permit displaying of the remaining portion of the content and the selected portion of the content in accordance with a priority level of content access rights of a second user when the content is accessed by the second user via the SNS site, wherein the content, including the remaining portion and the selected portion, that is uploaded is not censored prior to the uploading, and wherein the priority level of content access rights of the second user corresponds to either the first security level or the second security level;
    setting additional security information inputted by the second user in an another portion of the content uploaded to the SNS site, the additional security information including multiple security levels having different priority levels; and
    displaying the content according to the additional security information both of the first user and the second user when the content is accessed by a third user via the SNS site.

2. The method of claim 1, wherein the content comprises a photo or video.

3. The method of claim 1, further comprising setting the content access rights for the second user in the security information.

4. The method of claim 1, wherein the priority levels of content access rights are set according to at least device information, identification (ID) information, internet protocol (IP) information, or position information for a device in the security information.

5. The method of claim 1, further comprising setting the security information as a site-wide rule for an SNS site or for a specific group within an SNS site.

6. The method of claim 1, wherein the specific portion of the content with censoring is displayed as pixelated, blurred, blackened, or replaced when accessed by the second user.

7. The method of claim 1, wherein the security information inputted by the second user is a security level which designates the third user.

8. A mobile terminal comprising:
    a hardware controller configured to:
    select a specific portion of a content, wherein the content comprises the specific portion and a remaining portion, and wherein the specific portion is less than an entire portion of the content; and
    set security information for the selected portion of the content, the security information including multiple security levels, wherein each security level of the multiple security levels corresponds to a priority level of content access rights, wherein a first security level of the multiple security levels permits displaying of the specific portion of the content and the remaining portion of the content, without censoring, and wherein a second security level of the multiple security levels permits displaying of the remaining portion of the content without censoring and the displaying of the specific portion of the content with censoring;
    a wireless communication unit configured to:
    upload the content and the security information to a Social Network Service (SNS) site to permit displaying of the remaining portion of the content and the selected portion of the content in accordance with a priority level of content access rights of a second user when the content is accessed by the second user via the SNS site, wherein the content, including the remaining portion and the selected portion, that is uploaded is not censored prior to the uploading, and wherein the priority level of content access rights of the second user corresponds to either the first security level or the second security level, wherein the content is set additional security information inputted by the second user in an another portion of the content uploaded to the SNS site to display the content according to the additional security information both of the first user and the second user when the content is accessed by a third user via the SNS site, wherein the additional security information including multiple security levels having different priority levels.

9. The terminal of claim 8, wherein the content comprises a photo or video.

10. The terminal of claim 8, wherein the security information indicates whether the second user may view the content uploaded to the SNS site.

11. The terminal of claim 8, wherein the priority levels of content access rights are set according to at least device information, identification (ID) information, internet protocol (IP) information, or position information for a device.

12. The terminal of claim 8, wherein the security information is set for an entirety of the content or specific portion of the content.

13. The terminal of claim 8, wherein the security information is set as a site-wide rule for an SNS site or for a specific group within an SNS site.

14. The terminal of claim 8, wherein the specific portion of the content with censoring is displayed as pixelated, blurred, blacked, or replaced when the content is accessed by the second user.

* * * * *